United States Patent

Lin

[11] Patent Number: 5,924,564
[45] Date of Patent: Jul. 20, 1999

[54] DISK STORAGE DEVICE WITH SPRING ELEMENT

[76] Inventor: Jason Lin, 4F-3, No. 15, La. 178, Chuang Ching Rd., Taipei, Taiwan

[21] Appl. No.: 08/941,699

[22] Filed: Oct. 1, 1997

[51] Int. Cl.⁶ .................................................. B65D 85/57
[52] U.S. Cl. ........................ 206/308.1; 206/310; 206/425; 211/41.12
[58] Field of Search ............... 206/308.1, 309, 206/310, 425; 211/41.12, 40

[56] References Cited

U.S. PATENT DOCUMENTS

| | | | |
|---|---|---|---|
| 5,201,414 | 4/1993 | Kaszubinski | 206/309 |
| 5,263,580 | 11/1993 | Ciba et al. | 206/309 |
| 5,341,924 | 8/1994 | Morrone | 206/309 X |
| 5,558,220 | 9/1996 | Gartz | 206/308.1 |
| 5,586,650 | 12/1996 | Yeh | 206/308.1 |
| 5,590,770 | 1/1997 | Yeh | 206/308.1 |
| 5,593,031 | 1/1997 | Uchida | 206/308.1 |
| 5,706,938 | 1/1998 | Niehaus | 206/308.1 |
| 5,706,939 | 1/1998 | Yu | 206/308.1 |

*Primary Examiner*—Bryon P. Gehman
*Attorney, Agent, or Firm*—Bacon & Thomas, PLLC

[57] ABSTRACT

A disk storage device adapted for holding a disk having a center spindle hole, the disk storage device including a disk holder plate and a spring element fastened to the disk holder plate, the disk holder plate having a retainer flange forced into engagement with the center spindle hole of the loaded disk, and an insertion slot which receives the loaded disk, the spring element imparting an upward pressure to the loaded disk, causing the center spindle hole of the loaded disk to be firmly retained in engagement with the retainer flange.

1 Claim, 8 Drawing Sheets

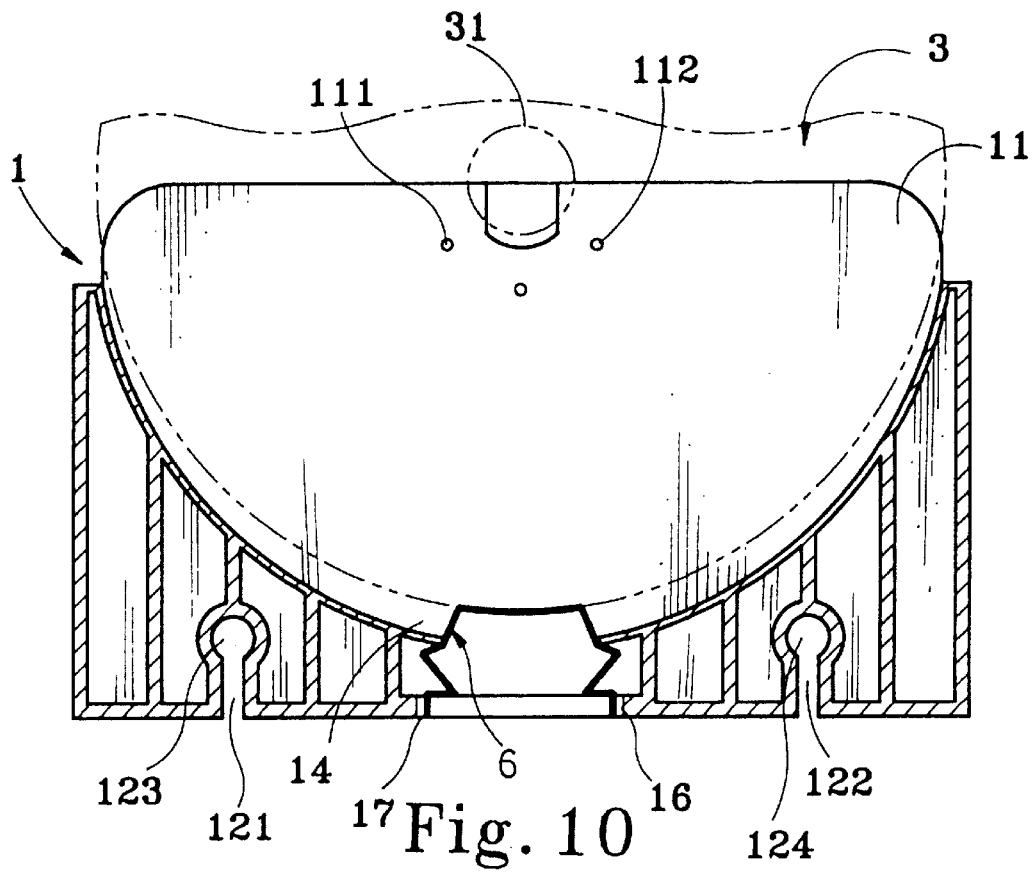
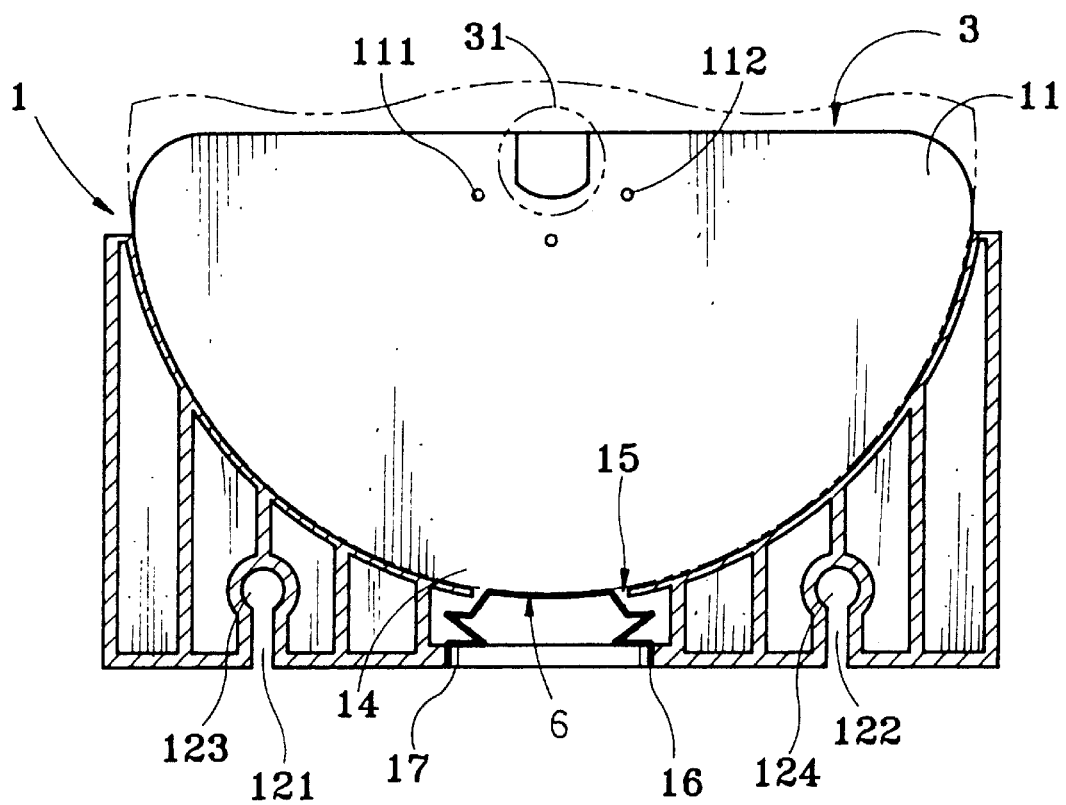

5,924,564

DISK STORAGE DEVICE WITH SPRING ELEMENT

BACKGROUND OF THE INVENTION

The present invention relates to a disk storage device for holding, for example, a compact disk, and more particularly to such a disk storage device which comprises a disk holder plate having a retainer flange for engaging the disk loaded thereon, and a spring element adapted to impart a pressure to the loaded disk against the retainer flange.

For holding a laser disk, for example a compact disk, an individual case may be used. A regular individual case for this purpose is generally comprised of a bottom shell, an upper shell hinged to the bottom shell, and a holder frame mounted within the bottom shell. The holder frame has a keeper at the center. When a compact disk is loaded, the keeper is forced into engagement with the center spindle hole of the compact disk, and therefore the compact disk is firmly retained in place. This structure of individual disk storage case has drawbacks. It is not easy to load a compact disk on the holder frame of the disk storage case. Another drawback of this structure of individual disk storage case is that the hinge structure between the bottom shell and the upper shell tends to be damaged. Furthermore, when a set of individual disk storage cases are arranged together, it is difficult to pick up a particular compact disk from the disk storage cases.

SUMMARY OF THE INVENTION

It is one object of the present invention to provide a disk storage device for holding an individual laser disk which permits the user to load/unload the disk conveniently and rapidly. It is another object of the present invention to provide a disk storage device for holding an individual laser disk which firmly retains the loaded disk in place. It is still another object of the present invention to provide a disk storage device for holding an individual laser disk which keeps the loaded disk from friction. According to the preferred embodiment of the present invention, the disk storage device comprises a disk holder plate and a spring element fastened to the disk holder plate, the disk holder plate having a retainer flange forced into engagement with the center spindle hole of the loaded disk, and an insertion slot which receives the loaded disk, the spring element imparting an upward pressure to the loaded disk, causing the center spindle hole of the loaded disk to be firmly retained in engagement with the retainer flange.

BRIEF DESCRIPTION OF THE DRAWINGS

FIG. 10 is a back view of FIG. 9, showing the undepressed state of the spring element, and FIG. 11 is a back view of FIG. 9, showing the spring element depressed by the loaded CD.

DETAILED DESCRIPTION OF THE PREFERRED EMBODIMENT

Figure 1:
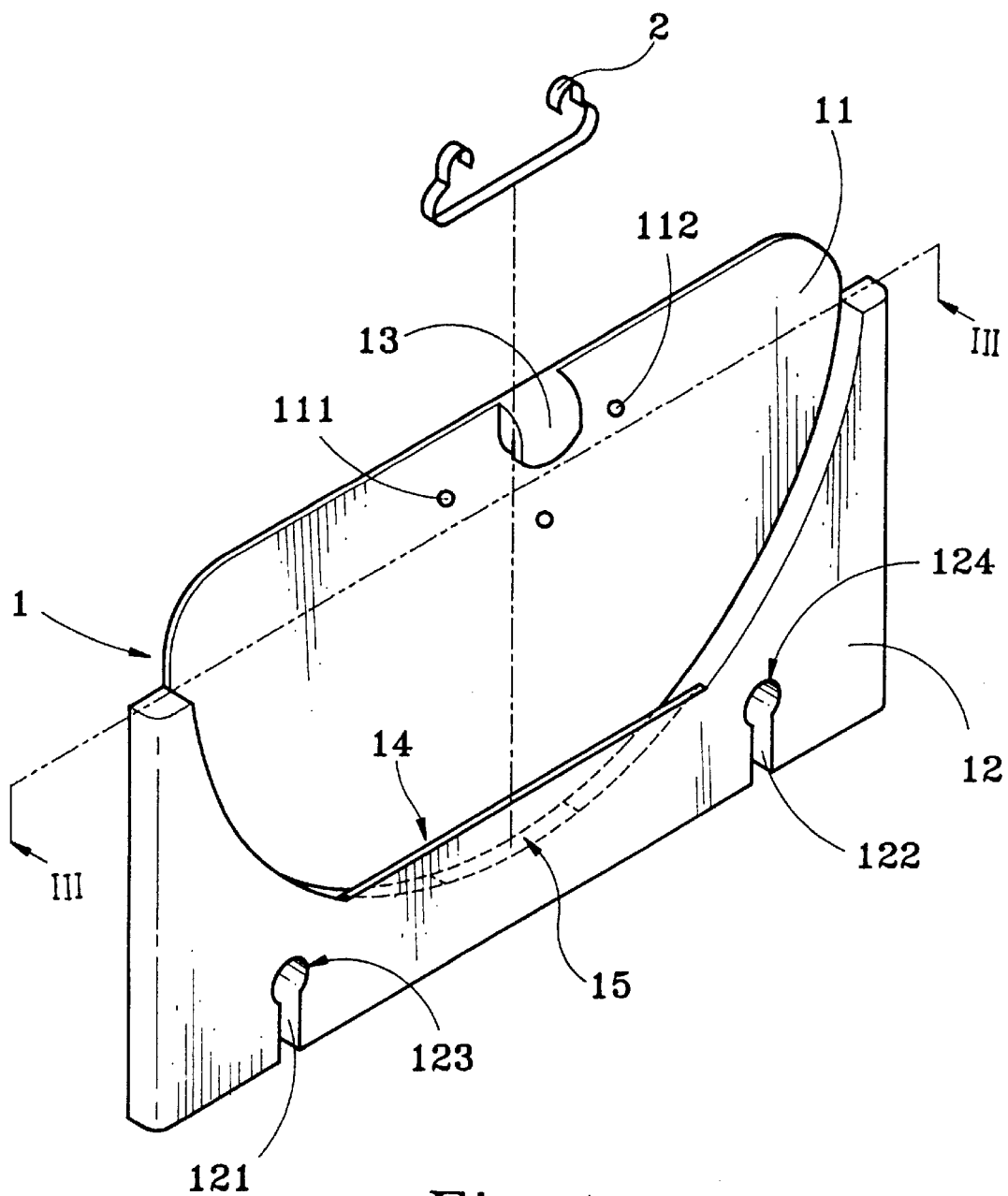
FIG. 1 is an exploded view of a disk storage device according to the present invention.
Figure 2:
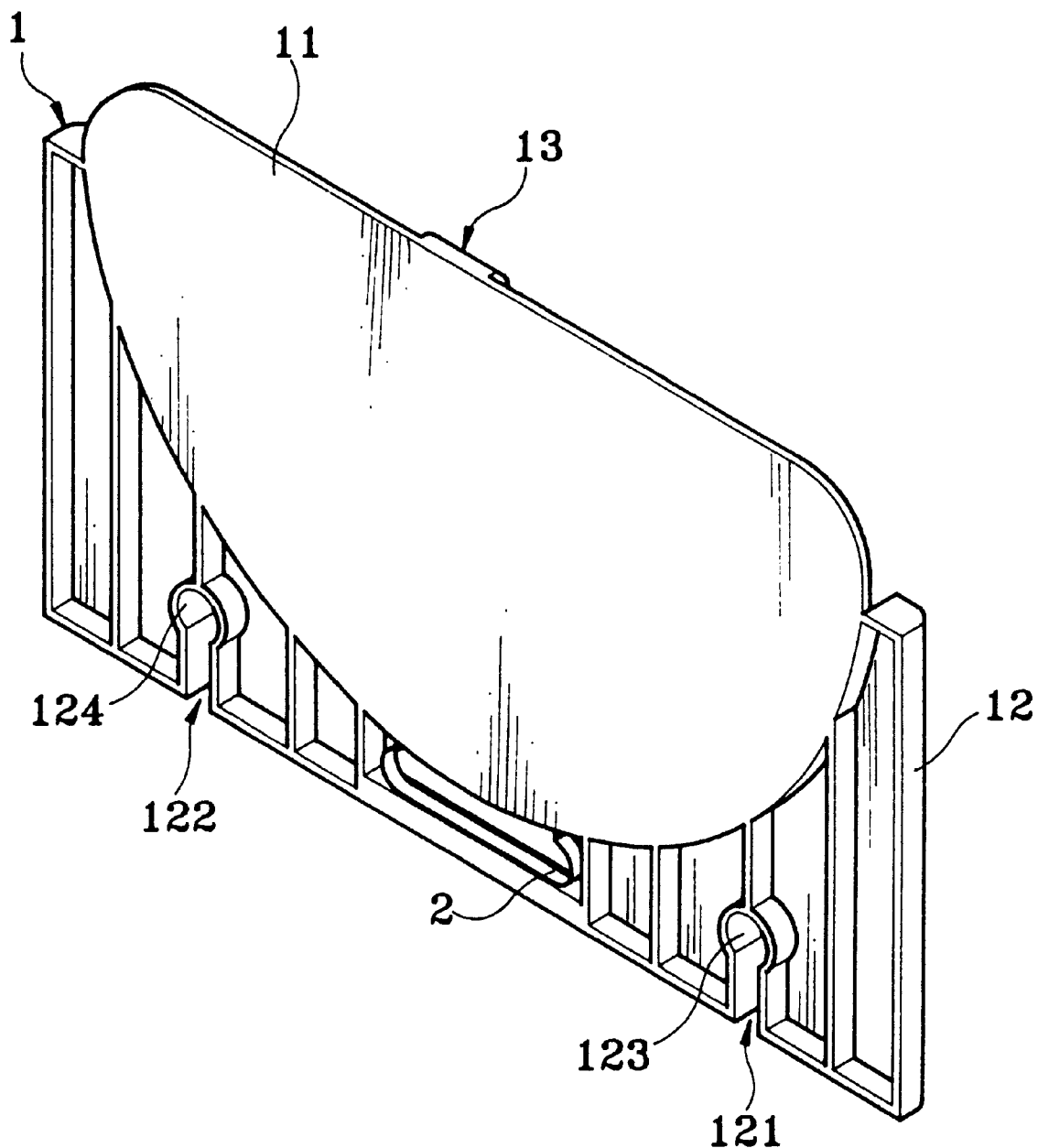
FIG. 2 is a back side view of the disk holder plate according to the present invention.
Figure 3:
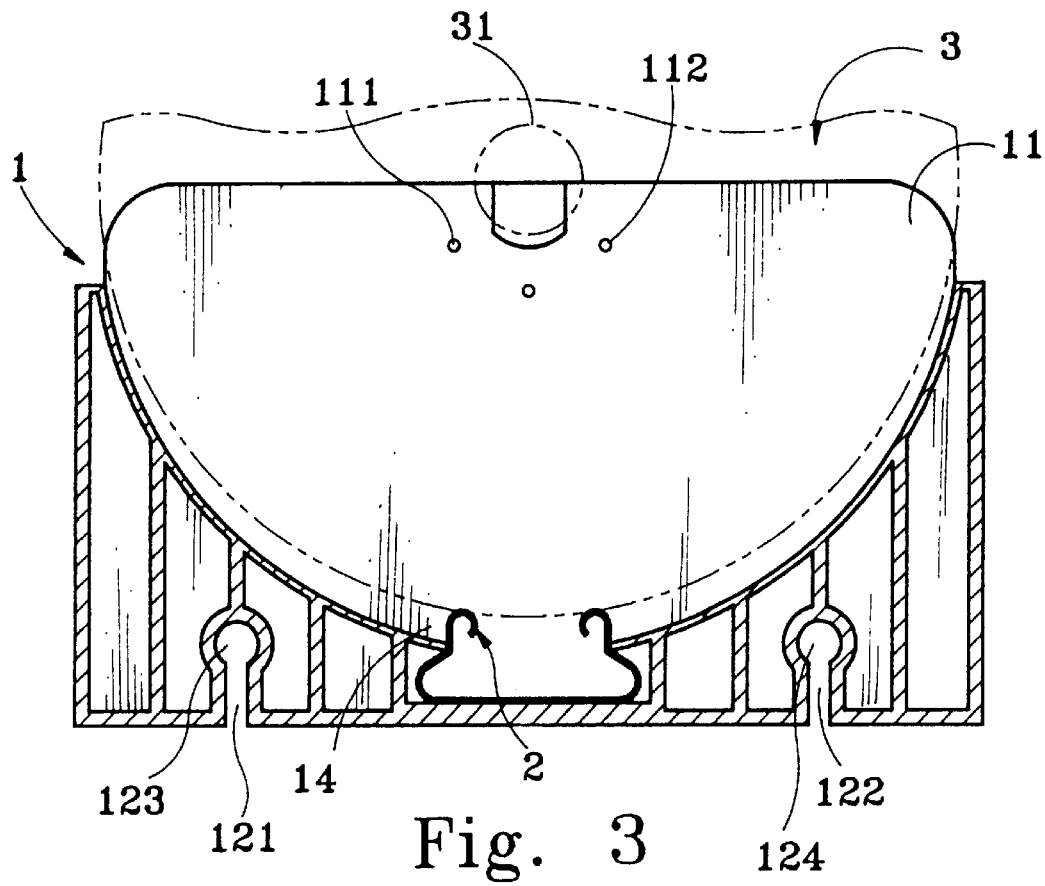
FIG. 3 is a front view in section of the present invention, showing a CD inserted into the insertion slot of the disk holder plate, the retainer flange of the disk holder plate forced into engagement with the center spindle hole of the loaded CD.

Referring to FIGS. 1, 2 and 3, a disk storage device in accordance with the present invention comprises a disk holder plate 1 adapted for holding an individual disk for example a CD (compact disk) 3, and a spring element 2 inserted through a locating hole 15 from the back side of the disk holder plate 1 and adapted to hold down the CD 3 in the disk holder plate 1.

The disk holder plate 1 comprises a disk storage area 11, a border area 12 around the disk storage area 11. An insertion slot 14 is defined between the disk storage area 11 and the border area 12. Into the insertion slot 14, a CD 3 is inserted and retained in the disk holder plate 1. There is provided a retainer flange 13 at the disk storage area 11. When a CD 3 is inserted into the insertion slot 14, the retainer flange 13 is forced into engagement with the center spindle hole 31 of the CD 3 to hold the CD 3 in the insertion slot 14.

Figure 9:
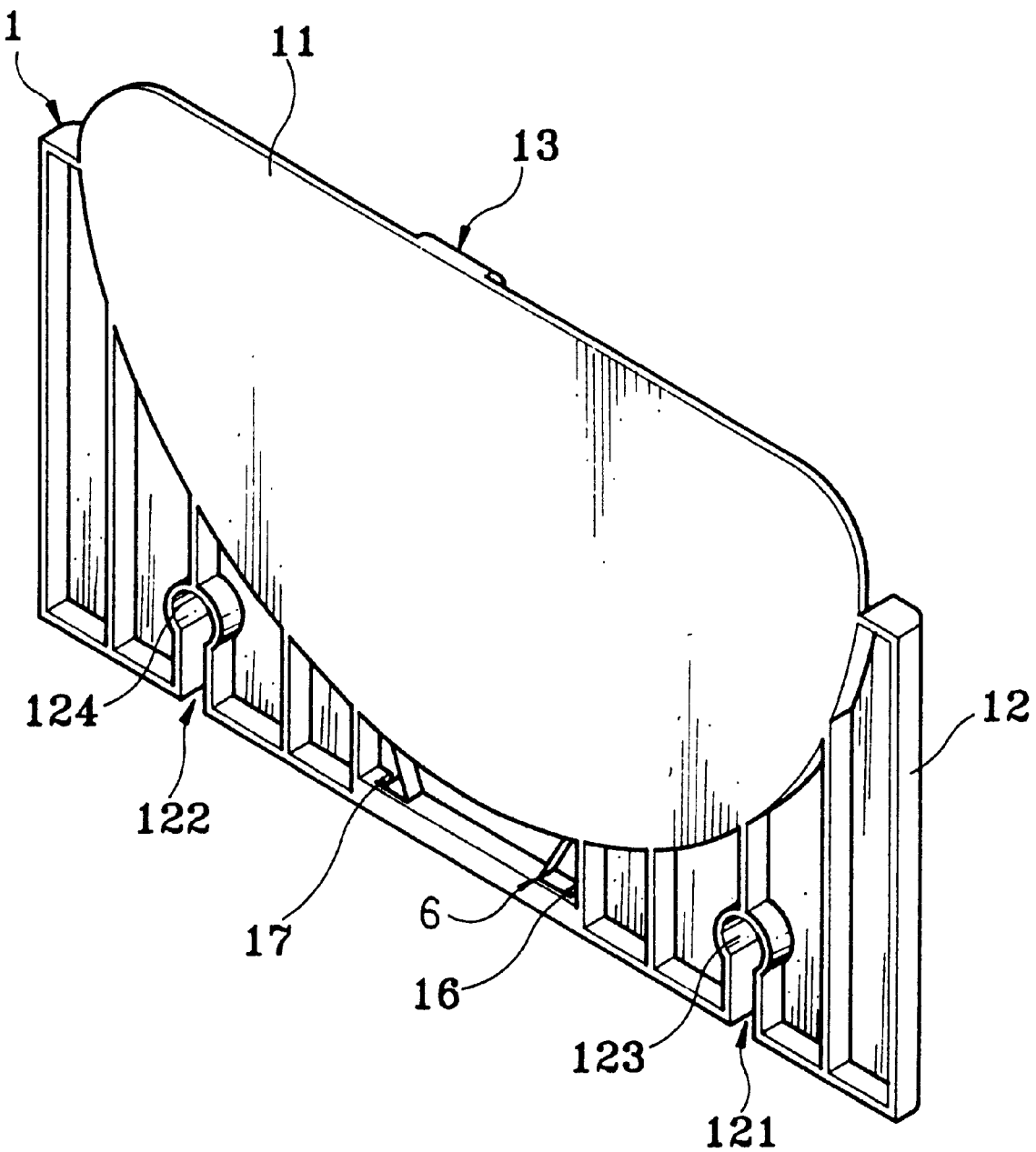
FIG. 9 is a back side view of another preferred embodiment according to the present invention, showing another design of the spring element applied.

In FIGS. 1~6, the spring element 2 is directly inserted into the locating hole 15 and fastened therein. As shown in FIGS. 9~11, a spring element 6 of another design is inserted into the locating hole 15 therein as well, however, two terminal ends of the spring element 6 are fastened respectively into two holes 16, 17.

The spring element 2 is inserted into the insertion slot 14 and fastened into the locating hole 15 of the disk holder plate 1. When installed, the spring element 2 imparts an upward pressure to the loaded CD 3, causing the periphery of the center spindle hole 31 of the loaded CD 3 to be firmly retained in engagement with the retainer flange 13. The spring element 2 can be a metal spring strip, spiral spring or plastic spring member.

Figure 4:
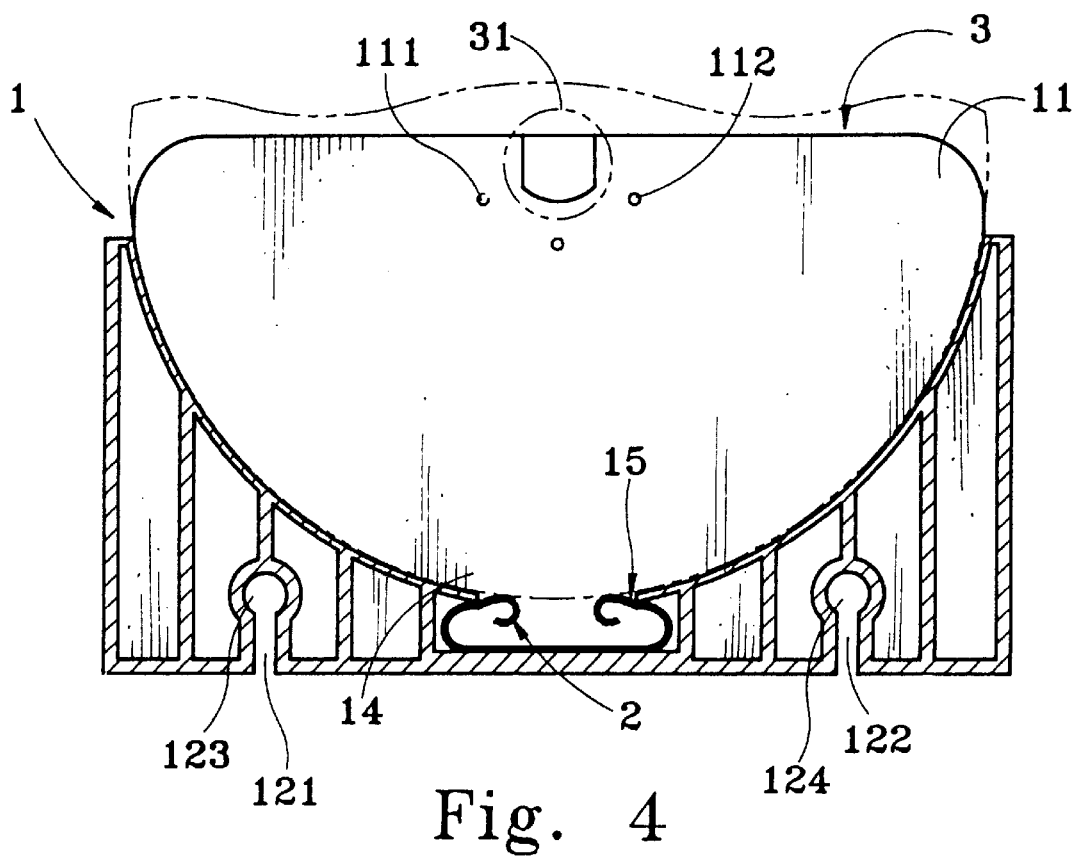
FIG. 4 is similar to FIG. 3 but showing the loaded CD pressed down, the retainer flange disengaged from the center spindle hole of the loaded CD.
Figure 5:
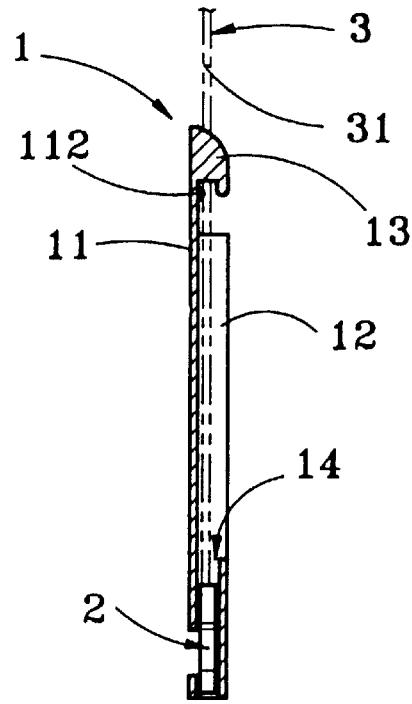
FIG. 5 is a side view of FIG. 3.

Referring to FIGS. 4 and 5 and FIG. 3 again, when a CD 3 is inserted into the insertion slot 14 of disk holder plate 1, it is forced downwards against the spring element 2 for permitting the retainer flange 13 to be forced into engagement with the center spindle hole 31 of the loaded CD 3. When the hand is released from the loaded CD 3, the spring element 2 immediately returns to its former shape, and the loaded CD 3 is pushed upwards by the spring element 2, causing the periphery of the center spindle hole 31 of the loaded CD 3 to be firmly retained in engagement with the retainer flange 13, and therefore the loaded CD 3 is firmly retained in the disk storage area 11 of the disk holder plate 1.

Figure 6:
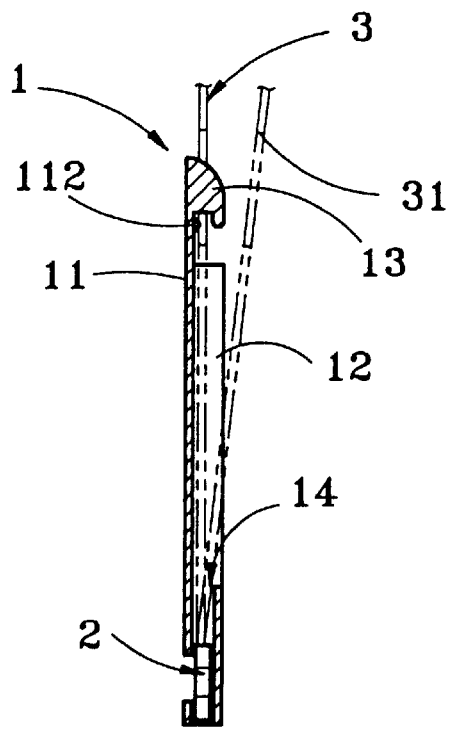
FIG. 6 is similar to FIG. 5 but showing the loaded CD disengaged from the retainer flange of the disk holder plate.

Referring to FIG. 6, when the loaded CD 3 is forced downwards against the spring element 2, the center spindle hole 31 of the loaded CD 3 is disengaged from the retainer flange 13 of the disk holder plate 1, and the loaded CD 3 can thus be removed from the insertion slot 14 of the disk holder plate 1.

Referring to FIGS. 1 and 3 again, raised portions 111;112 are provided at the disk storage area 11. When a CD 3 is loaded in the disk holder plate 1, the raised portions 111;112 engage non-data areas of the loaded CD 3 to prevent direct contact between the data storage area of the loaded CD 3 and the disk storage area 11 of the disk holder plate 1. The raised portions 111;112 can have any of a variety of shapes. For example, the raised portions 111;112 can each have a hemispherical or annular shape.

Figure 7:
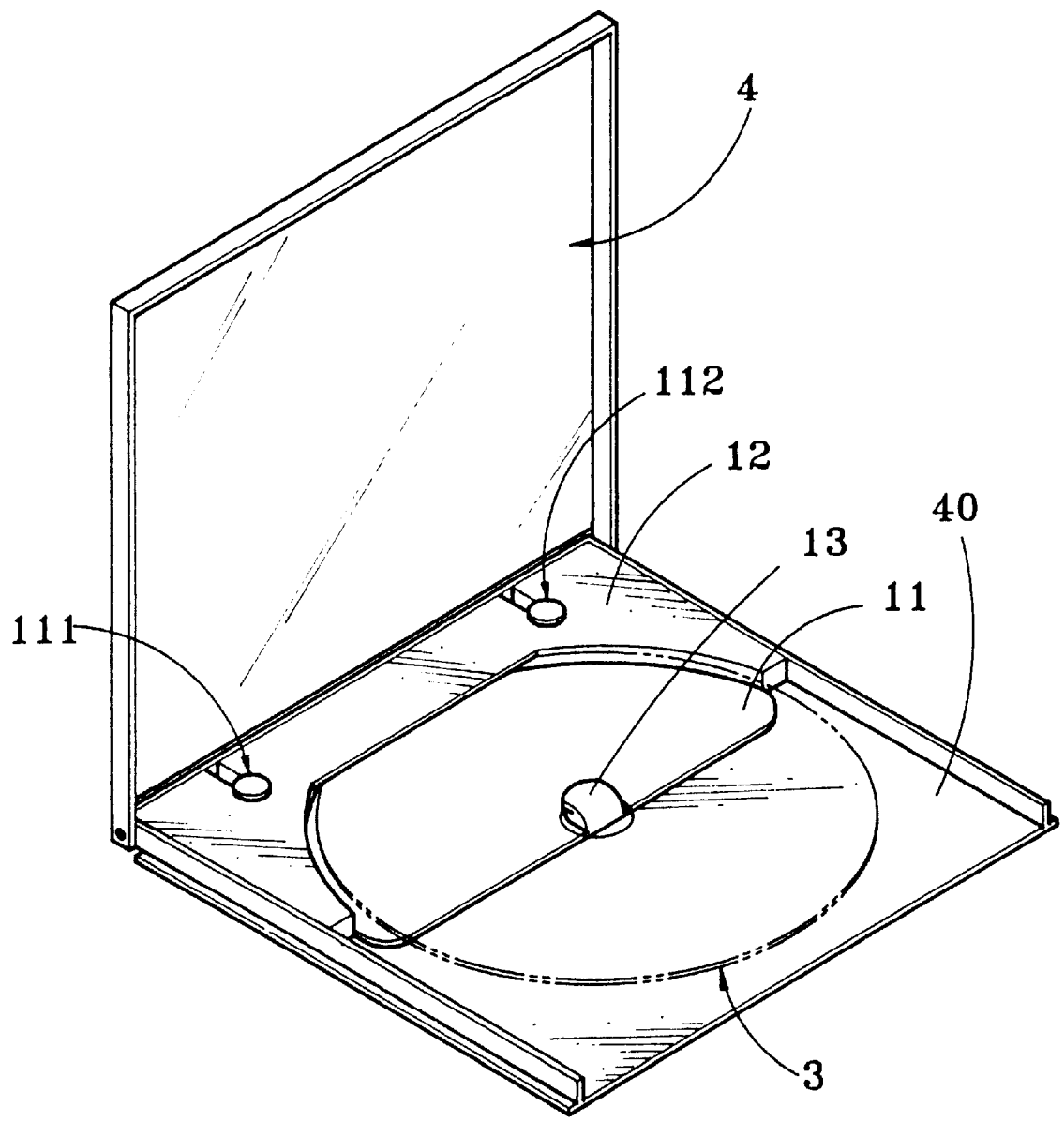
FIG. 7 is an applied view of the present invention, showing the disk storage device mounted in an individual case.

Referring to FIG. 7 and FIGS. 1 and 2 again, the disk holder plate 1 can be installed in a case, which is comprised of a bottom shell 40 and an upper shell 4 hinged to the bottom shell 40. The border area 12 of the disk holder plate 1 is provided with two rounded locating holes 123;124, and two splits 121;122 respectively extended from the rounded locating holes 123;124 to the bottom side of the disk holder plate 1. The bottom shell 40 comprises two headed bolts 111;112 bilaterally disposed on the inside adjacent the upper shell 4. When the disk holder plate 1 is loaded in the bottom shell 40, the headed bolts 111;112 of the bottom shell 40 are forced through the splits 121;122 into engagement with the rounded locating holes 123;124.

Figure 8:
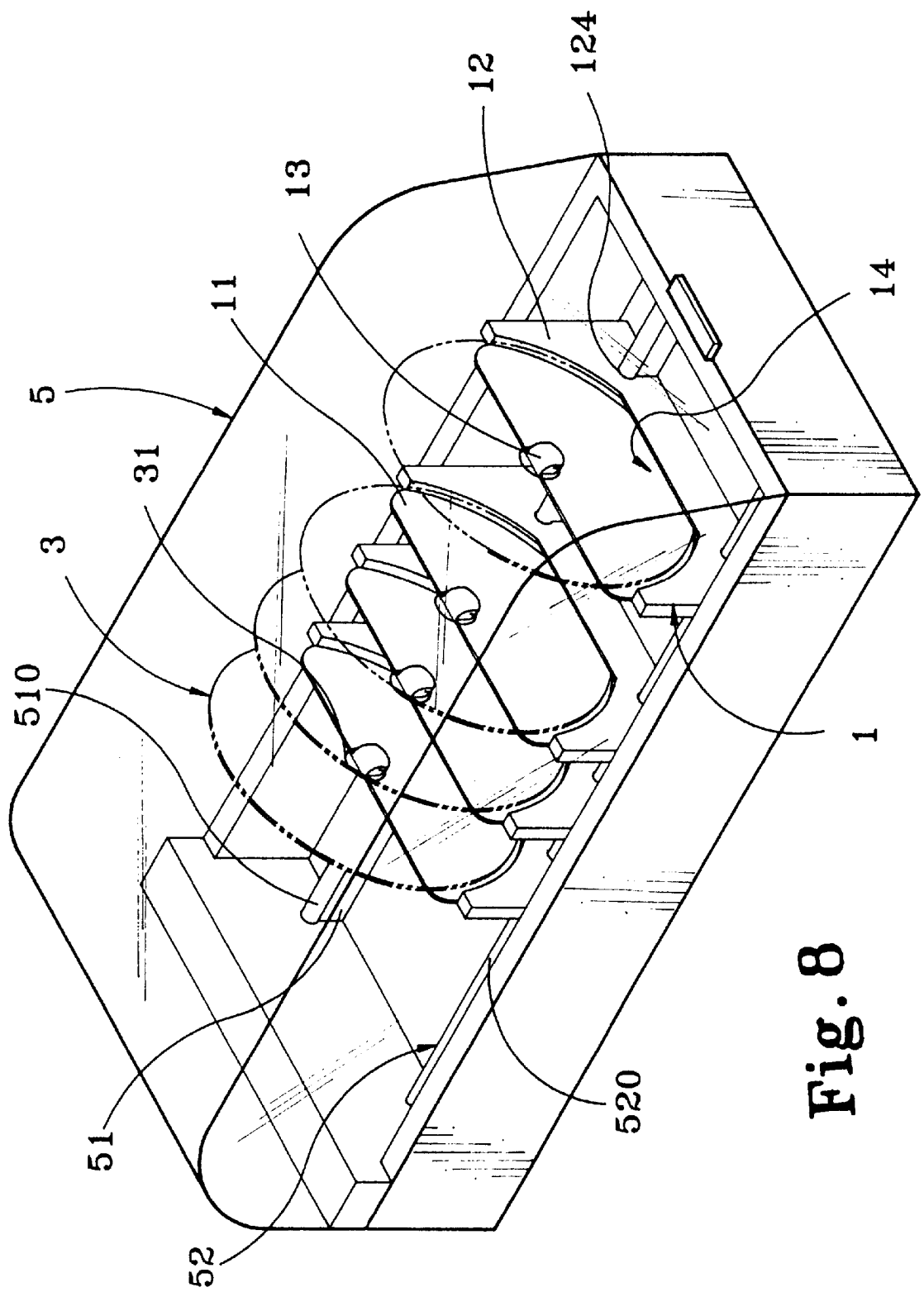
FIG. 8 is another applied view of the present invention, showing a set of disk storage devices mounted on flat longitudinal rails in a box.

Referring to FIG. 8, a box 5 is provided for holding a set of disk holder plates 1. The box 5 comprises two flat longitudinal rails 51;52 arranged in parallel and fitting the splits 121;122 of the disk holder plates 1. The flat longitudinal rails 51;52 have a respective top flange 510;520 of circular cross section adapted to fit the rounded locating holes 123;124 of the disk holder plates 1. The diameter of the rounded locating holes 123;124 is slightly greater than that of the top flanges 510;520 of the longitudinal rails 51;52, so that the loaded disk holder plates 1 can be tilted forwards or backwards for quick location of a particular CD 3 from the loaded disk holder plates 1.

What the invention claimed is:

1. A disk storage device for storing a disk having a center spindle hole, the device comprising a disk holder plate and a spring element fastened to said disk holder plate, said disk holder plate comprising a disk storage area and a border area, the disk storage area including a retainer flange adapted to engage the center spindle hole of the stored disk, and an insertion slot, defined between the disk storage area and an opposed portion of the border area which receives the stored disk, said spring element being mounted in said insertion slot for imparting a pressure to the stored disk, causing the center spindle hole of the stored disk to be firmly retained in engagement with said retainer flange.

* * * * *